April 5, 1960 R. A. SULLIVAN 2,931,522
UNLOADING MECHANISM FOR WET GRAIN STORAGE STRUCTURES
Filed Oct. 17, 1958 2 Sheets-Sheet 1

Inventor:
Raymond A. Sullivan
By: Schroder, Hofgren,
Brady & Wegner
Attorneys

April 5, 1960 R. A. SULLIVAN 2,931,522
UNLOADING MECHANISM FOR WET GRAIN STORAGE STRUCTURES
Filed Oct. 17, 1958 2 Sheets-Sheet 2

Inventor:
Raymond A. Sullivan
By Schroeder, Hofgren,
Brady & Wegner
Attorneys

United States Patent Office 2,931,522
Patented Apr. 5, 1960

2,931,522

UNLOADING MECHANISM FOR WET GRAIN STORAGE STRUCTURES

Raymond A. Sullivan, Harvard, Ill., assignor to Farm Structures & Supply Company, a corporation of Illinois Application October 17, 1958, Serial No. 767,855

6 Claims. (Cl. 214—17)

This invention relates to unloading means for wet grain storage structures, and in particular it relates to improved means for feeding grain from the bottom of a storage structure.

A relatively recent development in grain storage is the storage of grain, and particularly corn, in a so called "wet" condition. For purposes of the present disclosure, "wet grain" means grain containing from about 15% to about 32% moisture, and particularly from about 22% to about 32% moisture.

Proper discharge of grain having such a high moisture content has presented difficulties because the grain can form an arch, or bridge which is self-sustaining across an arc of several feet. The common types of grain feeders merely use a screw conveyor in a tube which has in its surface an opening through which the grain may enter the tube and be carried out of the storage structure by the screw conveyor.

When grain contains less than about 15% moisture ("dry" storage contemplates a moisture content of 8% to 10%) it will feed into the opening to a screw conveyor smoothly and fairly uniformly. On the other hand, wet grain can feed into the outlet opening, and the arching capacity of the wet grain in the mass above the opening can cause feed to stop completely when the grain below the arch is fed out. The condition is quite difficult to cope with, because an arch can only be broken by disturbing the arrangement of the grain in the storage structure to break the arch. This obviously is not easy in a storage structure containing several hundred bushels of grain.

The length of the arch across which grain may bridge will be described herein in terms of a chord of such arc. Thus, for example, certain common types of corn at a moisture content of about 28% have a "bridging chord" of about 5 feet—i.e., a chord of the arc on which the grain bridges is 5 feet long. The bridging chord varies somewhat with the nature of the grain and the moisture content, but for many of the grains which are stored wet the bridging chord is close to 5 feet.

In accordance with the present invention, a storage structure is provided with a conveyor screw tube having multiple openings, with a space between the mid points of adjacent openings which is substantially equal to the bridging chord of the stored grain. Thus, a suitable installation for wet corn will have conveyor feed openings in the conveyor tube which are about 5 feet center to center. Under ordinary conditions about 60% of the gain feeds through the opening which is farthest from the conveyor outlet; but if bridging slows down the flow through this outlet more grain is able to feed through the other outlet which is substantially at the opposite end of the bridging chord, thus breaking the bridge and permitting a resumption of normal flow.

Preferably the storage structure is provided with two conveyor tubes, each of which has multiple openings. The conveyor tubes are so arranged that there is a space of about 5 feet between their openings which are farther from the conveyor discharge, and the tubes converge so as to discharge at a common discharge area.

The number of openings in each tube depends upon the diameter of the storage structure. Thus, for example, a bin having a diameter of 17 feet requires tubes having three conveyor feed openings. Preferably, the opening farthest from the conveyor outlet and that nearest the outlet are a foot long, while the opening in the middle is 2 feet long.

A bin having a diameter of about 13 feet may be adequately emptied using auger tubes containing only two conveyor feed openings, each a foot long.

A storage structure, which is 19 feet in diameter, under the best conditions using a single conveyor tube with a single opening will contain a residue of 1200 bushels of grain which must be scooped into the conveyor feed opening with shovels. On the other hand, a 19 foot structure provided with two tubes, each having multiple openings, may be emptied of all but the last 300 bushels without any hand labor.

The invention is illustrated in a preferred embodiment in the accompanying drawings as applied to a storage structure of approximately 13 feet diameter. In the drawings.

Figure 1:
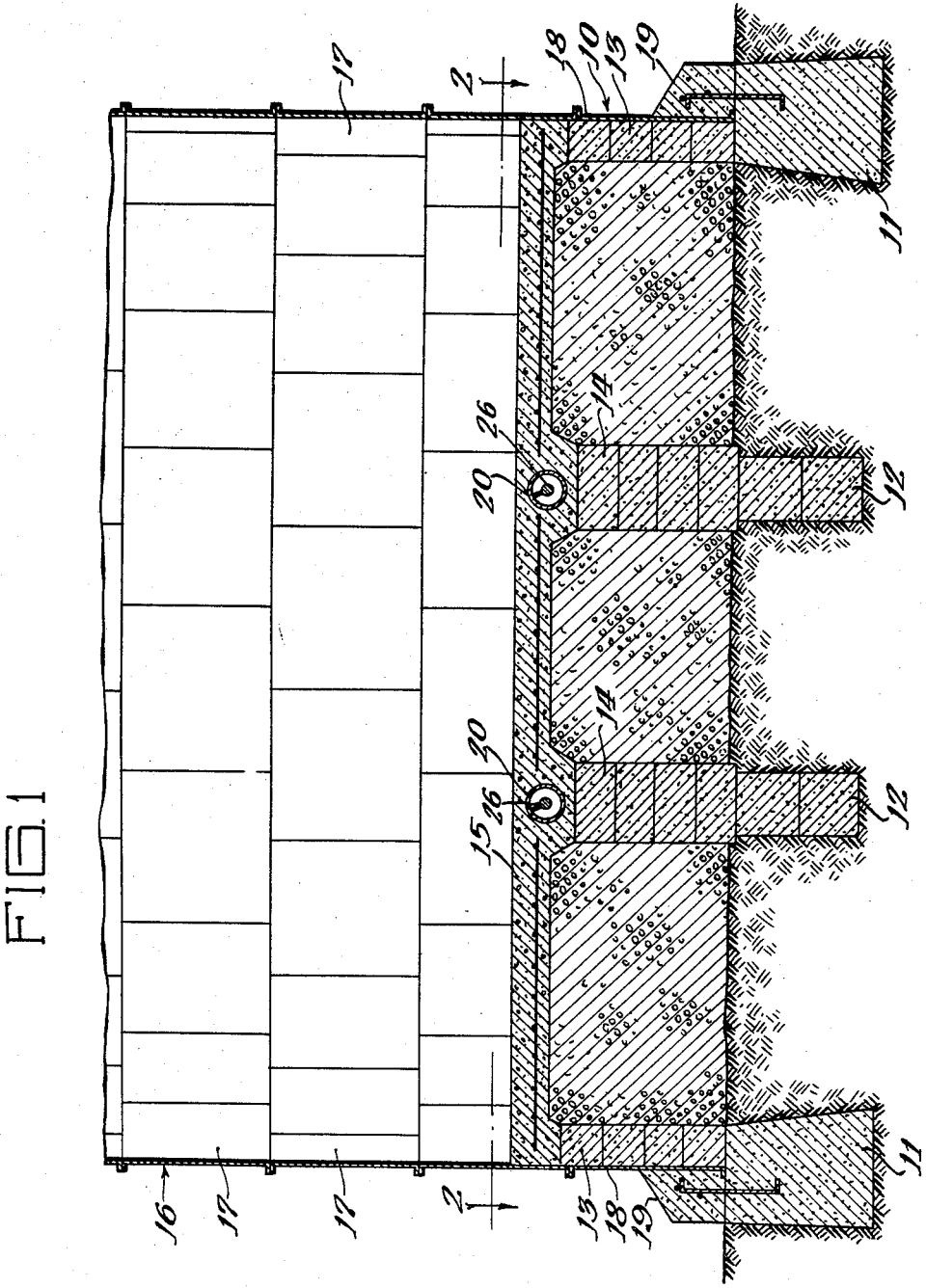
Fig. 1 is a fragmentary vertical central sectional view taken substantially as illustrated along the line 1—1 of Fig. 2.

Referring to the drawings in greater detail, a storage structure has a foundation, indicated generally at 10, which includes an annular concrete footing 11 and transverse footings 12, upon which are mounted an annular pier 13 and cross piers 14 which support a reenforced concrete floor 15. The body 16 of the storage structure consists of any desired number of superposed courses of sheet metal plates 17, with the base course 18 surrounding the annular pier 13 and encased at its lower portion by a reenforced buttress 19. The storage structure is provided with any conventional roof construction, and such filling equipment as may be desired.

Figure 2:
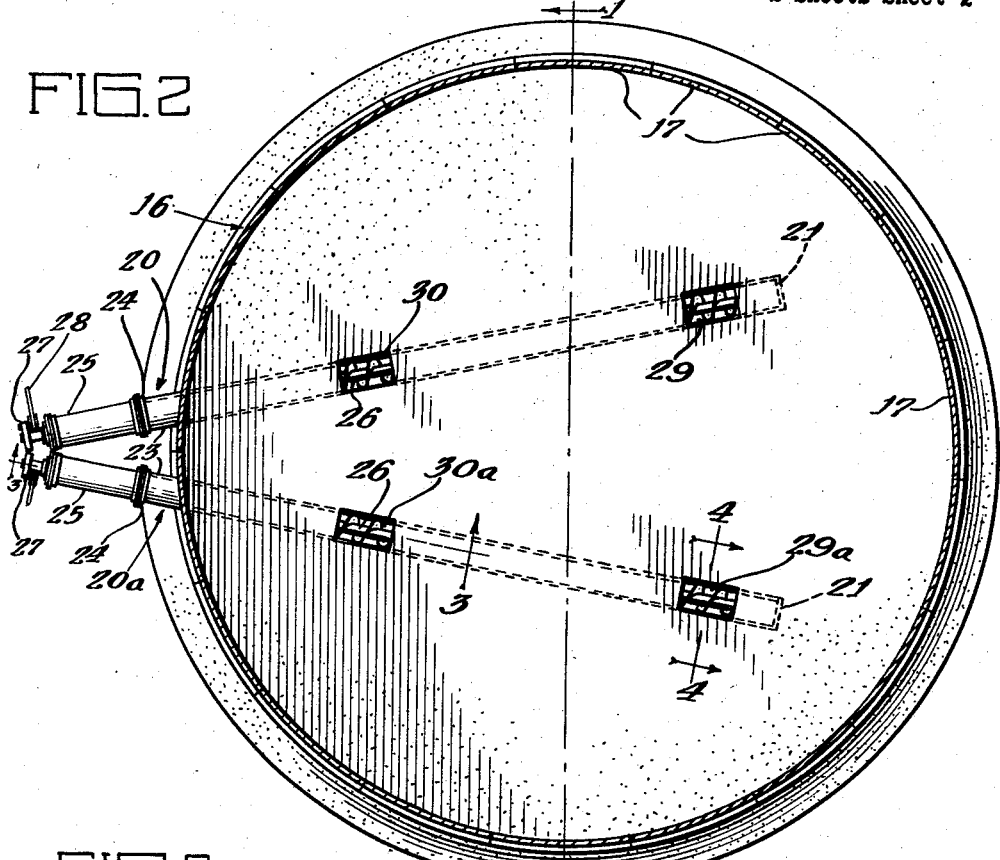
Fig. 2 is a horizontal sectional view on a reduced scale, taken substantially as illustrated along the line 2—2 of Fig. 1.

Two conveyor tubes 20 and 20a are set in the concrete floor 15 above the cross piers 14; and as seen in Fig. 2, said tubes having their inner ends 21 spaced apart a substantial distance and converge toward their outer ends 23, which are outside the storage structure, and have flanges 24 to receive auger drive housings 25. An auger 26 is mounted in each conveyor tube 20, and extends into the associated drive housing 25 with its auger shaft projecting outwardly into a gear case 27 through which the auger may be driven from any suitable source of power, as by a drive chain or belt 28.

Each auger tube is provided with a plurality of conveyor feed openings which afford passages for wet grain from the interior of the storage structure into the conveyor tubes. As seen in Fig. 2, auger tube 20 has a primary feed opening 29 and a secondary feed opening 30, and the space between centers of said feed openings is substantially equal to the bridging chord of wet grain stored in the structure. Thus, as previously stated, for many types of wet corn the distance between the centers of the openings 29 and 30 is preferably about 5 feet.

Figure 3:
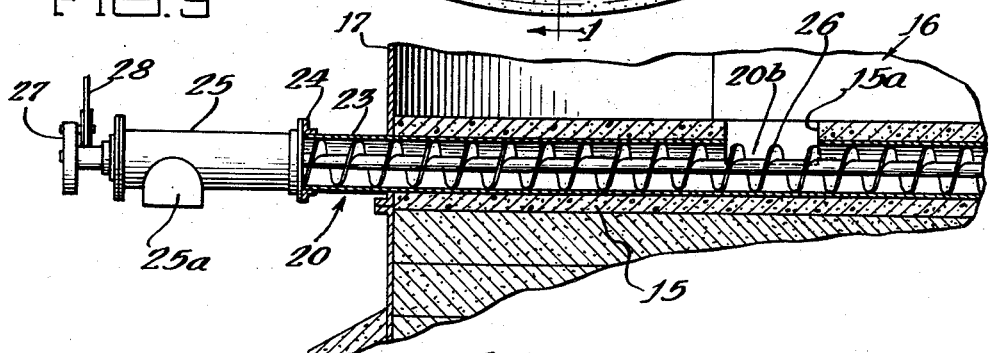
Fig. 3 is a fragmentary section on an enlarged scale taken substantially as illustrated along the line 3—3 of Fig. 2.
Figure 4:
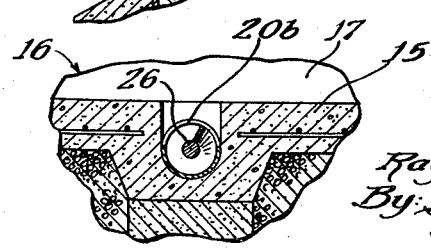
Fig. 4 is a fragmentary section on the same scale as Fig. 3 taken substantially as illustrated along the line 4—4 of Fig. 2.

Similarly, conveyor tube 20a has a primary feed opening 29a and a secondary feed opening 30a; and the space between primary feed openings 29 and 29a is about 5 feet center to center. Thus, bridging along the line of conveyor tube 20 is broken up by the feed of grain through the openings 29 and 30, while bridging transversely across the tubes tends to be broken up by the cooperative feed of the primary feed openings 29 and 29a of the two conveyor tubes. As best seen in Figs. 3 and 4, each of the feed openings includes a floor opening 15a in the concrete floor 15 and a registering opening 20b which extends around the entire upper half of the conveyor tube. Each of the openings is about one foot long, so that there is a small number of relatively small and widely spaced openings. Discharge of grain from the conveyors is through lateral openings in drive housings 25, provided with removable airtight closures 25a.

It is important that the feed openings be relatively small, and that they be fairly widely spaced, because if too much of the total length of the screw is exposed to the feed of grain from the storage structure, a very heavy screw is required and a motor of excessively high horsepower. A great many installations of the type here disclosed are used on farms where the electric power supply is of relatively limited capacity. Most farms cannot use equipment which produces a starting load in excess of 3 H.P. to 5 H.P., and for practical purposes the maximum starting load is 3 H.P. The maximum tolerable exposed screw area varies with the moisture content of the grain, so that it is not possible to state any top limit on the total exposed screw area which is permissible.

The mechanism is illustrated in the drawings with an auger 26 in each conveyor tube. However, a perfectly satisfactory installation may be made with only a single auger, which is moved from one conveyor tube to the other periodically to even out the feed of grain from various parts of the structure. Removal of the auger from a tube merely requires that the drive housing 25 be unbolted from flange 24, so that reverse rotation of the auger backs it out through the grain in the tube. Conversely, forward rotation of the auger with the outer end free causes it to work its way through the grain in the tube until the drive housing may be bolted to the flange 24.

The foregoing detailed description is given for clearness of understanding only and no unnecessary limitations are to be understood therefrom, as modifications will be obvious to those skilled in the art.

I claim:

1. In a wet grain storage structure, unloading means comprising: laterally extending mechanical conveyor means at the bottom of the structure for removing grain therefrom, said conveyor means having an outlet outside the structure; and a small number of relatively widely spaced horizontally disposed conveyor feed openings providing passages for grain from the structure to said conveyor means, the distance between centers of said openings being substantially equal to the bridging chord of wet grain stored in the structure, and the feed opening farthest from the outlet normally providing at least about 60% of the grain entering the conveyor means, the uninterrupted floor space between adjacent openings being of such length that when the start of bridge formation in the grain over the farthest feed opening reduces the flow through said opening, the increased flow through the next adjacent opening will break the support for the bridge and cause it to collapse, thereby maintaining a generally constant rate of feed of grain into said conveyor means.

2. In a wet grain storage structure, unloading means comprising: a laterally extending screw conveyor at the bottom of the structure for removing grain therefrom, said conveyor having an outlet outside the structure; and not less than two nor more than three horizontally disposed, relatively small conveyor feed openings providing passages for grain from the structure to the screw conveyor, the distance between centers of adjacent openings being substantially equal to the bridging chord of wet grain stored in the structure, and the feed openings farthest from the outlet normally providing at least about 60% of the grain entering the conveyor, the uninterrupted floor space between adjacent openings being of such length that when the start of bridge formation in the grain over the farthest feed opening reduces the flow through said opening, the increased flow through the next adjacent opening will break the support for the bridge and cause it to collapse, thereby maintaining a generally constant rate of feed of grain into said conveyor.

3. In a wet grain storage structure which is between about thirteen and about twenty-one feet in internal diameter, unloading means comprising: laterally extending mechanical conveyor means at the bottom of the structure for removing grain therefrom, said conveyor means having an outlet outside the structure; and a small number of horizontally disposed conveyor feed openings providing passages for grain from the structure to said conveyor means, each said opening being the width of the conveyor means and extending longitudinally thereof for a length of one to one and one half feet, the distance between centers of said openings being substantially equal to the bridging chord of wet grain stored in the structure, and the feed opening farthest from the outlet normally providing at least about 60% of the grain entering the conveyor means, the uninterrupted floor space between adjacent openings being of such length that when the start of a bridge formation in the grain over the farthest feed opening reduces the flow through said opening, the increased flow through the next adjacent opening will break the support for the bridge and cause it to collapse, thereby maintaining a generally constant rate of feed of grain into said conveyor means.

4. The device of claim 3 which has not less than two nor more than three feed openings.

5. In a wet grain storage structure, unloading means comprising: a pair of generally horizontal conveyor tubes extending across the bottom of the structure, said tubes having inner ends inside the perimeter of the structure and spaced apart by a substantial distance, and having closely adjacent discharge ends; screw conveyor means for said tubes; and a small number of relatively widely spaced conveyor feed openings in the upper portion of each tube providing passages for grain from the structure to said screw conveyor means, the distance between centers of the openings into each tube being substantially equal to the bridging chord of wet grain stored in the structure, and the feed opening farthest from the outlet of each tube normally providing at least about 60% of the grain entering the conveyor means, the uninterrupted floor space between adjacent openings into a tube being of such length that when the start of a bridge formation in the grain over the farthest feed opening reduces the flow through said opening the increased flow through the next adjacent opening will break the support for the bridge and cause it to collapse, thereby maintaining a generally constant rate of feed of grain into each of said conveyor tubes.

6. In a wet grain storage structure, unloading means comprising: a pair of generally horizontal conveyor tubes extending across the bottom of the structure, said tubes having inner ends inside the perimeter of the structure and spaced apart by a substantial distance, and having closely adjacent discharge ends; screw conveyor means for said tubes; and a small number of relatively widely spaced conveyor feed openings in the upper portion of each tube providing passages for grain from the structure to said screw conveyor means, the distance between centers of the openings into each tube and the distance between centers of the openings into the two tubes which are adjacent the inner ends of the tubes being substantially equal to the bridging chord of wet grain stored in the structure, and the feed opening farthest from the outlet of each tube normally providing at least about 60% of the grain entering the conveyor means, the uninterrupted floor space between adjacent openings into a tube being of such length that when the start of a bridge formation in the grain over the farthest feed opening reduces the flow through said opening the increased flow through the next adjacent opening will break the support for the bridge and cause it to collapse, thereby maintaining a generally constant rate of feed of grain into each of said conveyor tubes.

References Cited in the file of this patent
UNITED STATES PATENTS

| | | |
|---|---|---|
| 1,954,703 | Klein | Apr. 10, 1934 |
| 2,571,277 | Morrow | Oct. 16, 1951 |